United States Patent
Braun

[11] Patent Number: 6,129,450
[45] Date of Patent: Oct. 10, 2000

[54] MIXER WITH FEEDBACK CHANNEL FOR MEASURING RHEOLOGICAL PROPERTIES OF A MIXTURE

[75] Inventor: Hartmut Braun, Pfinztal, Germany

[73] Assignee: Gebr. Haake GmbH, Karlsruhe, Germany

[21] Appl. No.: 09/154,147

[22] Filed: Sep. 17, 1998

[30] Foreign Application Priority Data

Sep. 22, 1997 [DE] Germany ............................ 197 41 674

[51] Int. Cl.$^7$ .............................. B29B 7/72; B01F 15/00
[52] U.S. Cl. ............................ 366/83; 366/137; 366/140; 366/142
[58] Field of Search .......................... 366/79, 81, 83–85, 366/88, 90, 136–137, 140, 142; 425/204, 208, 209

[56] References Cited

U.S. PATENT DOCUMENTS

| | | |
|---|---|---|
| 2,538,465 | 1/1951 | Marco . |
| 3,148,231 | 9/1964 | Spencer . |
| 3,360,824 | 1/1968 | Schippers .................................... 366/81 |
| 3,704,972 | 12/1972 | Kneller et al. .......................... 425/203 |
| 4,308,998 | 1/1982 | Wood ....................................... 386/318 |
| 4,496,244 | 1/1985 | Ludwig .................................... 366/136 |
| 4,730,935 | 3/1988 | Kolossow ................................. 366/137 |
| 4,747,690 | 5/1988 | Hayashi ..................................... 366/98 |
| 4,897,236 | 1/1990 | Rabinger et al. .......................... 366/79 |
| 4,902,455 | 2/1990 | Wobbe ...................................... 366/89 |
| 5,130,070 | 7/1992 | Martin ....................................... 366/88 |
| 5,419,634 | 5/1995 | Bacher et al. ............................. 366/88 |
| 5,447,369 | 9/1995 | Boxall ..................................... 366/136 |
| 5,651,944 | 7/1997 | Schulz et al. .............................. 366/85 |

*Primary Examiner*—Charles E. Cooley
*Attorney, Agent, or Firm*—Paul Vincent

[57] ABSTRACT

A mixer in particular for viscous elastic materials has a processing channel having an outlet opening at one end which can be closed. The materials can be transported and simultaneously mixed along the processing channel using a a transport device. A feedback channel branches off from the processing channel near the outlet end and feeds back into the processing channel at an upstream location so that the material mixture can be circulated though the processing channel and the feedback channel when the outlet opening is closed. In order to be able to measure rheological quantities of the mixture during the mixing procedure, the feedback channel is configured as a measurement path. Towards this end a pressure sensor device can be provided for in the feedback channel to measure the transport pressure in the transported material mixture at at least two mutually separated cross sectional locations of the feedback channel.

7 Claims, 1 Drawing Sheet

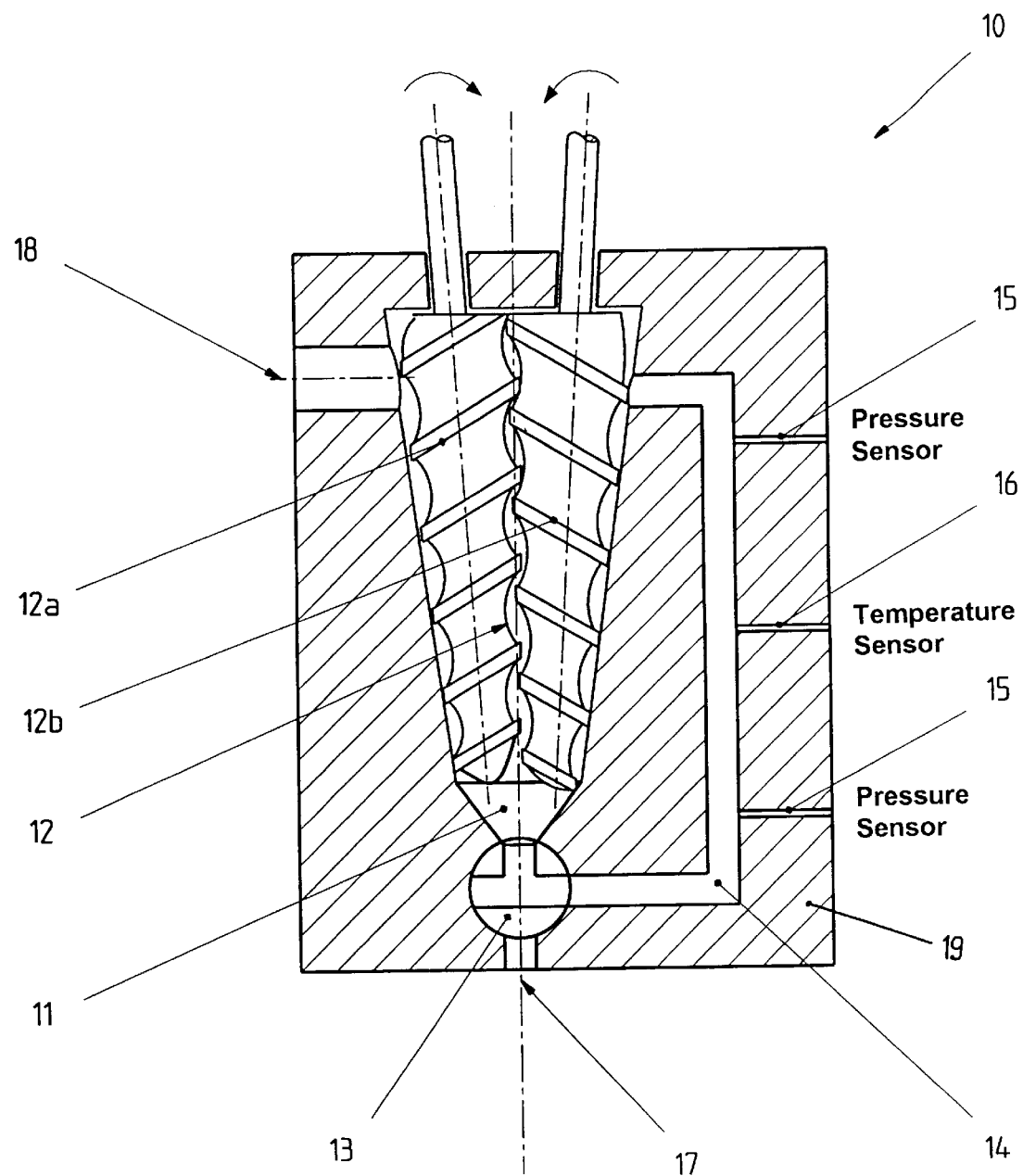

MIXER WITH FEEDBACK CHANNEL FOR MEASURING RHEOLOGICAL PROPERTIES OF A MIXTURE

This application claims Paris Convention priority of German Patent application Number 197 41 674.8 filed Sep. 22, 1997 the complete disclosure of which is hereby incorporated by reference.

BACKGROUND OF THE INVENTION

The invention concerns a mixer in particular for viscous elastic materials having a processing channel with a closeable outlet opening at its end and along which the materials can be transported by means of a transport device while being simultaneously mixed and with a feedback channel which branches off proximate to the outlet end of the processing channel and connecting back into this channel at an upstream location, wherein the material mixture can be circulated through the processing channel and the feedback channel when the outlet opening is closed.

A mixer of this kind can also serve as an extruder if the outlet opening is properly configured in a conventional manner and the expression "mixer" explicitly includes same.

Extruders generally have an elongated processing channel in which one or more worm conveyors are disposed. Differing amounts and kinds of mixing components, in particular high molecular viscous elastic materials such as polymers or elastomers, are introduced through a filler chute into the processing channel. The mixing components are subjected, within the processing channel and by means of the worm conveyors, to mechanical deformation forces and are thereby reformed and kneaded into a viscous elastic mass which is as homogeneous as possible. The processing characteristics and the viscosity of high molecular materials such as polymer melts or elastomers is determined by a combination of its viscous and elastic properties, wherein, among other things, the kind and the fractions of mixing components as well as the quality of the degree of distribution of all components have a substantial influence. The mixing components can be polymers having differing molecular structures or can include powdered filling materials having different particle sizes and differing particle size distributions. During mixing or kneading of the differing components, it is difficult or impossible to predict how the viscous or elastic properties of the mixture will change during the mixing or kneading process. It is also not possible to e.g. reliably predict the extent to which the processing characteristics of the mixture are changed by the mixing procedure in consequence of degradation and which useful properties the mixture will finally have. It is therefore of interest to be able to track both the viscosity as well as the elasticity of a mixture during the mixing process itself in dependence on the processing conditions and the mixing time.

These rheological quantities (primarily the viscosity) can be determined in conventional mixers by e.g. recording, for a constant rate of revolution of the worm conveyor, the time dependence of the resistance which the mass in the mixing chamber exercises on the screws by measuring the required power (torque) of the drive motor. However, since laminar layered flow does not establish itself in the mixing chamber, as is required for absolute viscosity measurements in rheometers, the viscosity values determined by the torque of the drive device have relative character only, in particularly since the partially highly complex flow geometry in the mixer and the remaining mixing parameters can have a substantial influence on the magnitude of this quantity.

Up to this point in time, absolute rheological measurements during the mixing procedure have not been carried out to a satisfactory extent. In particular, the changing material properties during mixing (compounding) are thereby of interest. A good mixing of the components requires mixing or whirling same as long as possible in a turbulent fashion. This can be achieved by transporting the components along a relatively long processing channel or by using conventional so-called feedback mixers or mixing extruders with which the outlet opening on the end of the processing channel can be closed to feed the material back via a feedback channel branching-off proximate the outlet end of the processing channel and introduced one more into the processing channel at an upstream location. The circulation of the material mixture through the processing channel and the feedback channel thereby achieved can effect a relatively long and thereby more intense mixing process despite a relatively short construction for the mixer or the extruder.

In order to determine the rheological quantities of the mixture, conventional mixers and extruders normally have a downstream rheometer device or branch-off a portion of the instantaneously produced mixture and introduce same into a rheometer and, if appropriate, feed it back into the main flow. In the first case, a determination of the rheological quantity is only possible at the end of the mixing procedure or by interrupting same. When a sample amount is branched off, the amount of time between the branching-off of the sample amount and the actual measurement must be kept as short as possible. This requires disposing special transport pumps in the branched channel for introducing the sample amount to the measuring device, leading to a complicated and expensive construction.

It is the underlying purpose of the invention to create a mixter of the above mentioned kind with which the rheological quantities of the mixture can be reliably determined during the mixing process.

SUMMARY OF THE INVENTION

This purpose is achieved in accordance with the invention in that the feedback channel is configured as a measuring path for determining the characteristic rheological quantities. This is preferentially done by disposing a pressure sensor device in the feedback channel to measure the pressure in the transported material mixture at at least two mutually separated cross sectional locations of the feedback channel.

The invention is based on the fundamental realization of reconfiguring a mixer or extruder having a feedback channel in such a fashion that a determination of the rheological characteristics can be effected incrementally or continuously during the actual mixing process. Towards this end, the feedback channel is configured as a geometrically defined capillary or channel and used for the rheological measurements. In one embodiment, at least the pressure difference in the feedback channel between two points separated by a certain distance is determined in order to calculate the shear stress in the mixture. At least one temperature sensor is also preferentially disposed in the feedback channel by means of which the temperature of the transported mixture is recorded.

In order to be able to calculate the shear velocity of the mixture it is necessary to determine the volume transported through the feedback channel, the cross section of which is known. This is possible in a particularly simple fashion if the materials in the processing channel are subjected to forced transport i.e. are transported in a predetermined direction so that the volume transported through the feedback channel is a unique function of the rate of revolution of the transport device. This type of forced transport is, in particular, possible if the transport device has at least one worm conveyor and preferentially two combing oppositely running worm conveyors in the processing channel which can be conical or parallel. It has turned out that similar results can also be obtained with two combing conical worm conveyors running in the same direction. If the cross sectional dependence of the feedback channel is known and preferentially constant, at least in regions and particularly between the measurement cross sections, it is possible to determine the shear velocity from the volume throughput of the mixture.

Instead of determining the rheological quantities from the pressure difference, the volume throughput, and the channel geometry other measurement methods can also be utilized in the feedback channel. For example, it is possible to dispose small sensors in or on the wall surface of the feedback channel which directly measure the shear stress in the material mixture flowing thereby. Alternatively, it is possible to measure the velocity profile or the differential velocity profile of the material mixture flowing in the feedback channel using an ultrasound device and to thereby calculate the shear velocity. These and other measuring methods are per se known in the art of rheology.

During the mixing or processing procedure, the material is circulated cyclically in a continuous manner through the processing channel and the feedback channel and rheologically measured each time when flowing through the feedback channel. In this manner, the mixer or extruder in accordance with the invention facilitates an in-line rheological measurement with which the same material is repeatedly investigated. The configuration as a feedback mixer facilitates very compact sizes with which even the rheological processing dependence of very small sample amounts, e.g. in excess of five grams, can be reliably tracked. The flow cross section of the feedback channel is preferentially substantially smaller than the cross section of the processing channel to establish a high flow velocity during circulation of the material mixture in the feedback channel so that the material mixture is introduced to and flows by the measurement device at a relatively short period of time following entrance. It has turned out that, in accordance with the invention, a precise measurement of absolute rheological quantities is possible for the time dependent characterization of compounding states and degradation processes in dependence on shear or temperature influences.

Further details and features of the invention can be extracted from the subsequent description of an embodiment with reference to the drawing.

BRIEF DESCRIPTION OF THE DRAWING

The single FIGURE represents a schematic representation of a cross section of a mixer in accordance with the invention.

DESCRIPTION OF THE PREFERRED EMBODIMENT

In accordance with the FIGURE, a mixer 10 in a housing 19 has a processing channel 11 tapering down in the transport direction having, in accordance with the FIGURE, an inlet opening 18 at its upper end and an outlet opening 17 at the opposite end. The outlet opening 17 can be opened or closed by means of a closing element 13 in form of a three way valve. A transport device 12 in the form of two worm conveyors 12a, 12b is disposed in the processing channel 11 the worm conveyors 12a, 12b being in combed relationship with one another and driven in opposite directions as indicated by the arrows.

Proximate to the outlet end of the processing channel 11 and proximate the outlet opening 17, a feedback channel 14 branches-off from the processing channel 11 and feeds back into the processing channel 11 proximate the inlet opening 18. In the embodiment shown, the feedback channel 14 has a constant cross section and has pressure sensors 15 disposed at separated cross sectional locations which can measure the pressure of the material flowing in the feedback channel 14. A temperature sensor 16 is also provided for in the feedback channel 14.

The two worm conveyors 12 effect a forced transport of the material in the processing channel 11 and thereby also in the feedback channel 14 so that the volume flow in the feedback channel 14 is a unique function of the rate of revolution of the worm conveyors 12a, 12b. The outlet opening 17 is closed during the mixing or processing procedure so that the material is circulated a plurality of times through the processing channel 11 and the feedback channel 14, wherein the rheological quantities are calculated from the pressure and temperatures values measured in the feedback channel 14, the known geometry of the feedback channel, and the volume flow correlated with the rate of revolution of the worm conveyors.

After the mixing procedure has ended, the outlet opening 17 is opened so that the material can be transported out of the processing channel 11 via the outlet opening 17.

I claim:

1. A mixer comprising:

an inlet section;

an outlet opening disposed at an end of the mixer;

a closing member for closing said outlet opening;

a processing channel extending from said inlet section to said outlet opening;

a transport device for transporting a material through and for mixing the material within said processing channel;

a feedback channel having a first connection to said processing channel proximate said outlet opening and having a second connection to said processing channel proximate said inlet section; and a measurement member disposed in said feedback channel between said first connection and said second connection, said feedback channel and said measurement member for measuring rheological properties of the mixture, whereby the mixture is circulated through said processing and feedback channels when said closing member is closed.

2. The mixer of claim 1, wherein said measurement member comprises a pressure sensor device for measuring a pressure in the material at two mutually separated cross sections of said feedback channel.

3. The mixer of claim 1, wherein said feedback channel has a length of constant cross section.

4. The mixer of claim 1, wherein said measurement member comprises a temperature sensor.

5. The mixer of claim 1, wherein said transport device drives the material through said processing channel under forced transport.

6. The mixer of claim 1, wherein said transport device comprises a first worm conveyor disposed within said processing channel.

7. The mixer of claim 1, wherein said transport device comprises two combing oppositely driven worm conveyors disposed within said processing channel.

* * * * *